(12) United States Patent
Mourou

(10) Patent No.: US 8,205,923 B2
(45) Date of Patent: Jun. 26, 2012

(54) RETAINING CLIP FOR DITCH MOLDING

(75) Inventor: Julien P. Mourou, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 166 days.

(21) Appl. No.: 12/886,294

(22) Filed: Sep. 20, 2010

(65) Prior Publication Data

US 2012/0068488 A1 Mar. 22, 2012

(51) Int. Cl.
*B60R 13/02* (2006.01)

(52) U.S. Cl. ...................... 296/1.08; 52/716.5

(58) Field of Classification Search ................. 296/1.08, 296/93, 210; 52/716.5; 277/921; 428/31
See application file for complete search history.

(56) References Cited

U.S. PATENT DOCUMENTS

| | | | | |
|---|---|---|---|---|
| 7,004,535 B1 * | 2/2006 | Osterberg et al. | ........ | 296/203.03 |
| 7,029,060 B1 | 4/2006 | Osterberg | | |
| 7,407,224 B2 | 8/2008 | Okabe | | |
| 7,604,287 B2 | 10/2009 | Mourou | | |
| 7,621,574 B2 * | 11/2009 | Mourou et al. | ............... | 296/1.08 |
| 8,070,204 B2 * | 12/2011 | Mourou | ........................ | 296/1.08 |
| 2008/0277973 A1 * | 11/2008 | Mourou | ........................ | 296/210 |
| 2009/0021053 A1 * | 1/2009 | Harberts et al. | ............... | 296/213 |
| 2009/0051183 A1 * | 2/2009 | Mourou et al. | ............... | 296/1.08 |
| 2009/0102241 A1 * | 4/2009 | Harberts et al. | ............... | 296/213 |
| 2009/0188198 A1 * | 7/2009 | Scroggie et al. | ............. | 52/716.7 |
| 2010/0199593 A1 * | 8/2010 | Mourou | ........................ | 52/716.7 |

* cited by examiner

*Primary Examiner* — Lori Lyjak

(57) ABSTRACT

A ditch molding has a head with left and right wings that lap onto the roof, a stem depending from the head, and an enlarged foot at the lower end of the stem. A molding clip has a base mounted in the ditch and left and right biasing arms have wedge faces that engage with the foot to urge the foot downwardly into the ditch, establishing an installed position of the molding. The left and right biasing arms yield away from each other upon an upward movement of the foot. Left and right trap arms also provided on the clip have trap ends overlying the foot of the molding in spaced relation there from when the molding is in the installed position. Upward movement of the foot causes the foot to engage with the trap ends of the trap arms, trapping the foot against further upward movement.

19 Claims, 2 Drawing Sheets

RETAINING CLIP FOR DITCH MOLDING

FIELD OF THE INVENTION

The present invention relates to a ditch molding for a vehicle roof ditch and more particularly provides an improved molding clip for retaining a ditch molding within the ditch.

BACKGROUND OF THE INVENTION

Modern motor vehicles include a roof panel and a side body panel that are joined together by a series of electric resistance welds which are formed at the bottom of a flanged structure extending along the mating edges of the roof panel and the side body panel. This structure creates a ditch at the juncture between the roof panel and the side panel that extends along the roof of the motor vehicle. A molding of flexible plastic is installed into the ditch to provide an esthetically pleasing appearance and also prevent dirt and foreign matter from residing in the ditch. The molding is often retained within the ditch by a series of molding clips that are mounded at the bottom of the ditch and have the molding inserted into the clips.

It would be desirable to provide a new and improved molding and molding clip that would allow the insertion of the molding into the clip with a minimal force to facilitate the vehicle assembly process. It would also be desirable that an improved molding and molding clip would enhance the centering of the molding within the ditch and provide highly reliable retention of the molding so that the molding is not released from the vehicle during the extremes of vehicle use, such as vibration of the vehicle and the forces applied to the molding by the rotating brushes in a car wash.

SUMMARY OF THE INVENTION

A ditch molding has a head with left and right wings that lap onto the roof, a stem depending from the head, and an enlarged foot at the lower end of the stem. A molding clip has a base mounted in the ditch and left and right biasing arms have wedge faces that engage with the foot to urge the foot downwardly into the ditch, establishing an installed position of the molding. The left and right biasing arms yield away from each other upon an upward movement of the foot. Left and right trap arms also provided on the clip have trap ends overlying the foot of the molding in spaced relation therefrom when the molding is in the installed position. Upward movement of the foot causes the foot to engage with the trap ends of the trap arms, trapping the foot against further upward movement.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
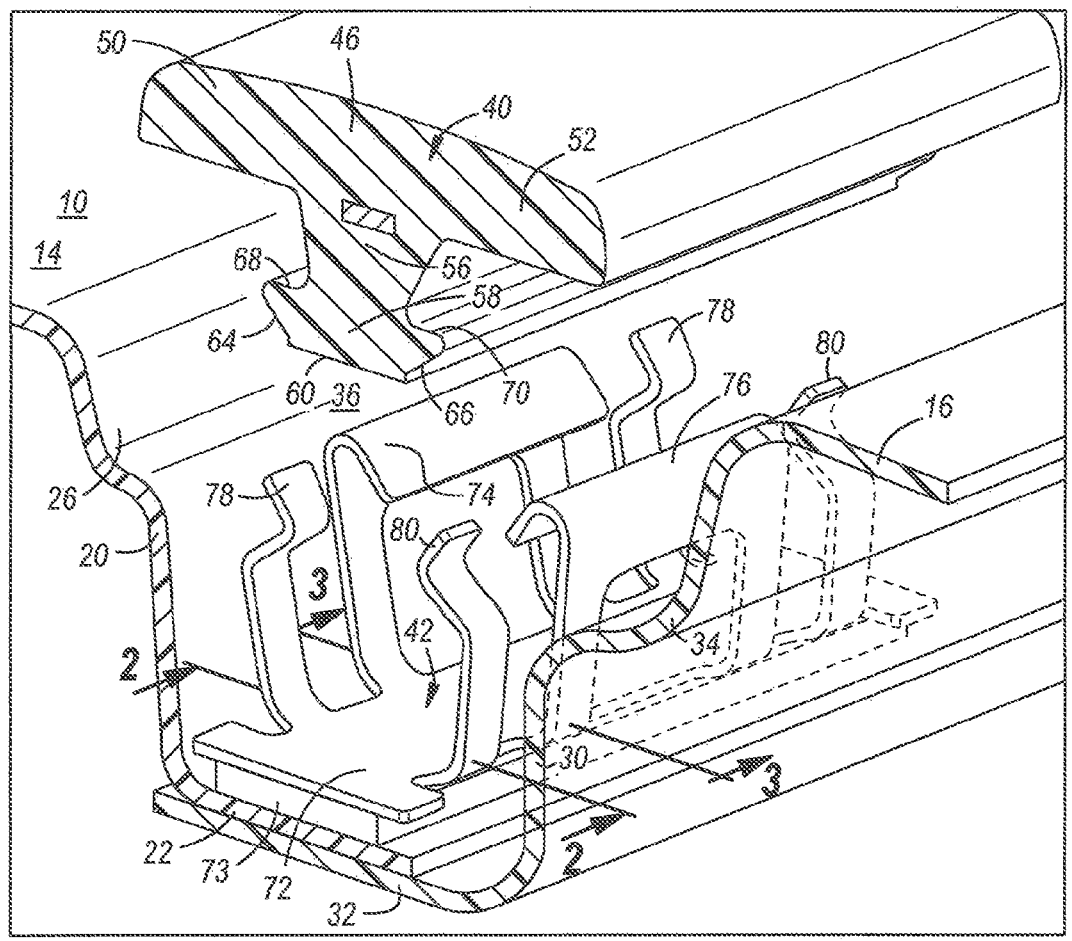
FIG. 1 is a perspective view taken through a vehicle roof, having parts broken away and in section, showing a molding poised for installation into the molding clip.

As seen in FIG. 1, a vehicle body roof, generally indicated at 10, includes a roof panel 14 and a body side panel 16 that each carry a flange structure that will be used to attach the panels together. In particular, the roof panel 14 has a flange including a vertical wall 20 and a horizontal wall 22. The vertical wall 20 has a shelf 26 that is indented below the upper surface of the roof panel 14. The body side panel 16 has a vertical wall 30 and a horizontal wall 32. A shelf 34 is provided in the vertical wall 30. The horizontal walls 22 and 32 overlap with one another and are welded together by a series of electric resistance spot welds, not shown, that are provided along the length of the panels 14 and 16. Accordingly, as seen in FIG. 1, the juncture between the roof panel 14 and body side panel 16 forms a ditch 36 that will run the length of the vehicle roof 10.

An extruded plastic molding, generally indicated at 40, is provided to fill the ditch 36 and a plurality molding or retaining clips, generally indicated at 42, are attached to the vehicle body roof 10 for retaining the molding 40 in place.

Molding 40 is made of a relatively flexible plastic in an extrusion process. The molding 40 includes a head 46 that includes a left wing 50 that will extend into overlapping engagement with the shelf 26 of the roof panel 14 and a right wing 52 that will extend into overlapping engagement with the shelf 34 of the body side panel 16. The molding 40 also has a stem 56 that depends downwardly from the head 46. An enlarged foot 58 is provided at the lower end of the stem 56. Bottom 60 of the foot 58 includes an upwardly inclined left inline surface 64 and an upwardly inclined right incline surface 66. Foot 58 also includes a left upper surface 68 and a right upper surface 70.

As seen in FIG. 1, the molding clip 42 is a generally u-shaped structure including a base 72, and left and right side walls. Base 72 is suitably attached at the bottom of the ditch 36 by an adhesive or adhesive tape 73. Molding clip 42 is of stamped metal construction and the side walls are formed as clip arms that extend upwardly from the base 72 to provide retaining functions by their engagement with the foot 58 of the molding 40. The clip arms include opposing left and right trap arms 74 and 76 and also opposing left and right biasing arms 78 and 80. As seen in FIG. 1, the biasing arms and the trap arms are spaced a somewhat apart along the length of the molding clip 42, and a pair of the biasing arms 78 and 80 are preferably provided on both sides of the trap arms 74 and 76. A plurality of these molding clips 42 are installed at spaced intervals along the length of the ditch 36 and will thereby retain the molding 40 at many places along the length of the molding 42.

Figure 2:
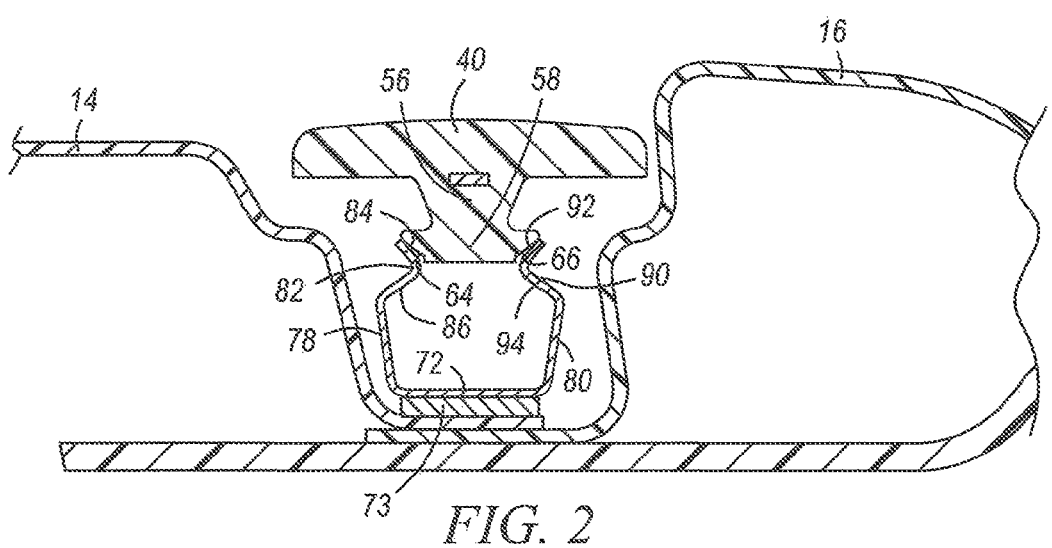
FIG. 2 is a cross section taken through the molding and molding clip, showing biasing arms, and showing the molding being installed.

As seen in FIG. 2, the left-hand biasing arm 78 is integral with the base 72 and rises therefrom and is bent at the upper portion thereof to provide a wedge 82 that includes an upper wedge face 84 and a lower wedge face 86. The right-hand biasing arm 80 is provided opposite the left-hand biasing arm 78 and similarly constructed including having a wedge 90 with an upper wedge face 92 and a lower wedge face 94.

FIG. 2 also shows the molding 40 while it is being installed into the molding clip 42. As seen in FIG. 2, the left lower incline surface 64 of the molding foot 58 is engaging with the upper wedge face 84 of the molding clip 42. Likewise, the right lower incline surface 66 of the molding foot 58 is engaging with the upper wedge face 92 of the molding clip 42. Thus, as can be readily seen in FIG. 2, a downward insertion force applied to the molding 40 will cause the foot 58 to forcibly spread apart the opposed biasing arms 78 and 80 so that the foot 58 can pass between the left wedge 82 and the right wedge 90.

Figure 3:
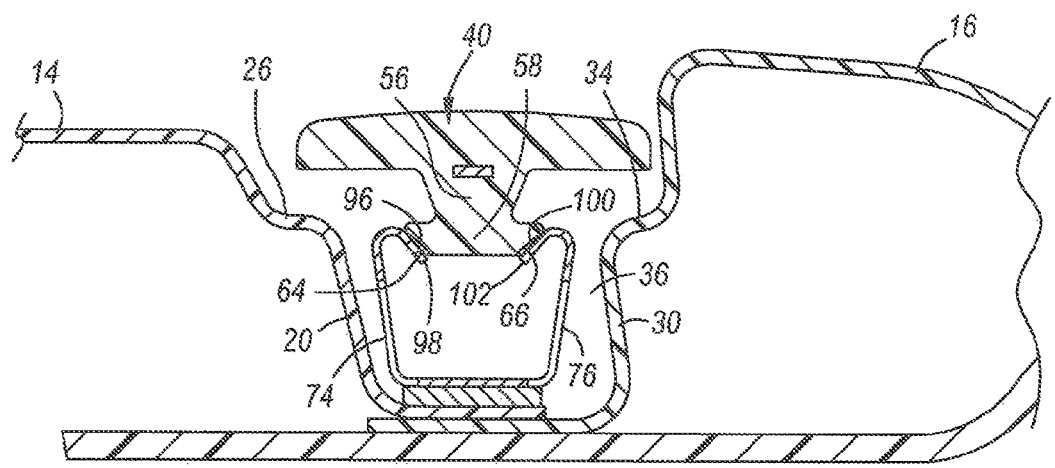
FIG. 3 is a cross section view through the molding and molding clip, showing trap arms, and showing the molding being installed.

Referring to FIG. 3 it is seen that the trap arms 74 and 76 oppose one another and rise from the clip base 72. The upper end of the left trap arm 74 extends downwardly toward the ditch center, forming a ramp surface 86 that terminates at a trap end 84. Thus the upper end forms a ramp surface 86. Likewise the right trap arm 76 has its upper end extending downwardly to provide a ramp surface 88 and a trap end 90. FIG. 3 shows the molding 40 being installed into the molding clip 42. It is seen that the left lower incline surface 64 of the foot 58 is engaging with the left ramp surface 86 of left trap arm 74. Likewise the lower incline surface 66 of the foot 58 is resting on the ramp surface 88 of the right-hand trap arm 76. Upon the application of a downward force on the molding 40, the trap arms 74 and 76 will be forcibly spread apart to allow the head 58 to pass beyond the trap arms 74 and 76 as will be discussed further hereinafter.

Figure 4:
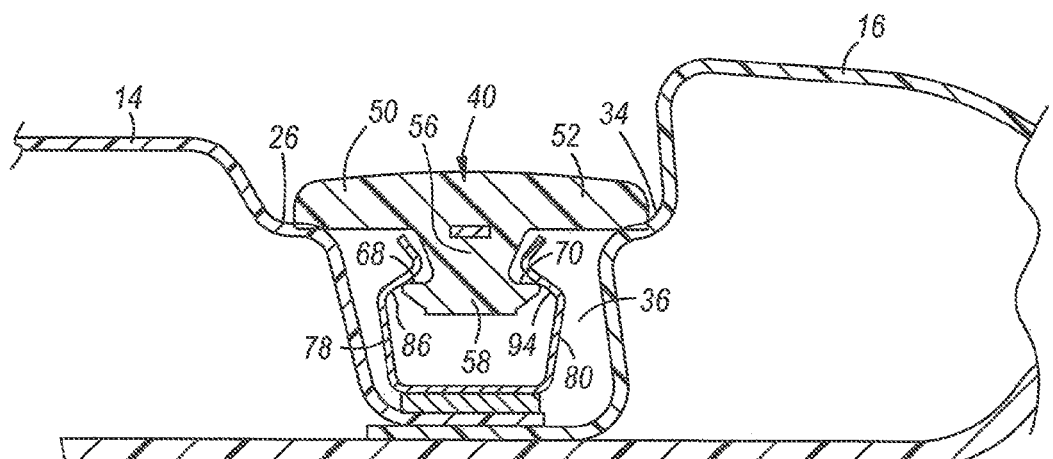
FIG. 4 is a view similar to FIG. 2 but showing the installed position of the molding with the biasing arms imposing a downward force on the molding.
Figure 5:
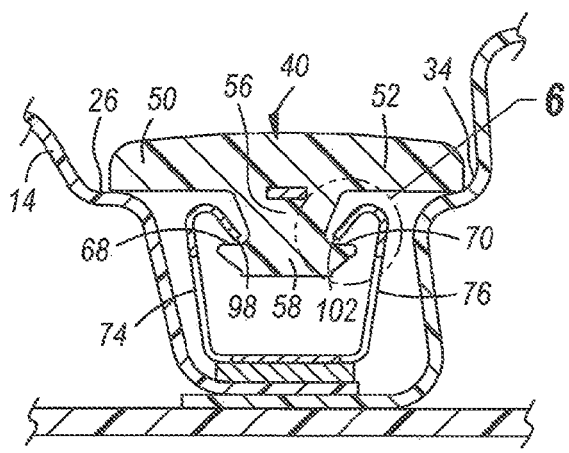
FIG. 5 is a view similar to FIG. 3 but showing the installed position of the molding with the trap arms overlying the molding to trap the molding in the installed position.

FIGS. 4, and 5 show the molding 40 fully installed into the molding clip 42 to fill the ditch 36. Upon the full insertion of the molding 42 the left wing 50 and right wing 52 of the molding 40 are engaging respectively with the shelf 26 of the roof panel 12 and the shelf 34 of the body side panel 16.

As best seen in FIG. 4, the opposed biasing arms 78 and 80 are self-biased inwardly toward one another so that the lower wedge face 84 of the left biasing arm 78 is pressing against the left upper surface 68 of the foot 58 and the lower wedge face 94 is pressing against the right upper surface 70 of the foot 58. Accordingly, once the molding 40 reaches its fully installed position of FIG. 4, the biasing arms 78 and 80 are providing a continuous ongoing downward force upon the molding 40. This downward force is counteracted by tension within the resilient plastic material of the molding 40 so that the left wing 50 and right wing 52 are held tight against the roof 10. The wings 50 and 52 may be flexed somewhat and the stem 56 may be stretched in this fully installed condition. And, the opposing forces applied by the left and right biasing arms 78 and 80 will act to keep the molding 40 centered within the ditch 36.

Figure 6:
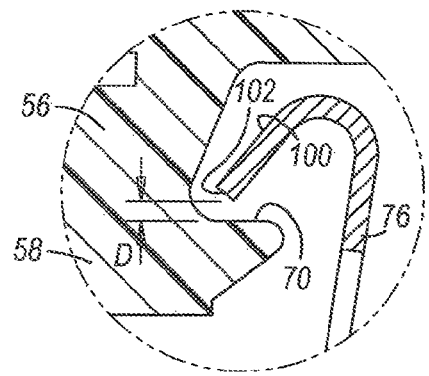
FIG. 6 is an enlargement of a fragment of FIG. 5.

As seen in FIG. 5, when the molding 40 is fully installed, the trap arm ends 98 and 102 will be spaced a distance somewhat above the left and right upper surfaces 68 and 70 of the molding foot 58. In FIG. 6, this distance is shown more clearly and designated "D".

Thus, as seen in FIGS. 4 and 5, the normal installed position of the molding 40 is determined by the effect of the biasing arms 78 and 80 that have their wedge surfaces 86 and 94 bearing downwardly on the enlarged foot 58. During normal usage of the vehicle, the molding 40 will experience vibration or forces that may push downwardly on the molding 40 or pull upwardly on the molding 40. For example in an automatic car wash the rotating brushes will traverse along the length of the molding 40 and can be expected to be pushed downwardly in some regions but simultaneously the molding will be pulled upwardly in other regions. The biasing arms 78 and 80 function to apply a constant downward force on the foot 58 of the molding 40 so that the left and right wings 50 and 52 of the molding 40 will remain in contact with the shelf 26 of the roof panel 14 and the shelf 34 of body side panel 16 even though the molding 40 may be experiencing some limited up and down movement. It will be understood however that the application of a large enough force to the molding in the upward direction may overcome the resilience of the biasing arms 78 and 80 sufficient to allow an upward movement of the foot 58 through the distance "D" of FIG. 6 to the point where the upper surfaces 68 and 70 of the enlarged foot 58 will come into engagement with the trap ends 84 and 90 of the trap arms 74 and 76 so that the trap arms 74 and 76 will provide an extra level of retention of the molding 40 and provide further prevention against its removal from the ditch 36 in addition to the action of the biasing arms 78 and 80.

In view of the foregoing, it will be appreciated then that the biasing arms 78 and 80 will provide a first range of retaining forces on the molding 40 that will resist its removal from the ditch 36. For example, in the fully installed position of FIGS. 4 and 5, the biasing arms 78 and 80 may apply downward acting force to the foot 58 of about 23 Newtons. Then, upon progressive attempted upward removal of the molding 40, the biasing arms 78 and 80 will be forcibly spread further apart and thereby will provide an increasing additional biasing force that will resist the removal of the molding 40. Then, when the upward movement has progressed through the distance "D", for example upon application of an upward force of 70 Newtons, the foot 58 will be engaged with the trap ends 98 and 102 of the trap arms 74 and 76 to provide additional restraint against the removal of the molding 40. With the application of an even greater removal force, the plastic material of the molding 42 will eventually flex, stretch, and yield, and the trap arms 74 and 76 may yield somewhat, to allow the foot 58 to squeeze past the trap arms 74 and 76. Thus the molding will be released from its engagement by the biasing arms 78 and 80 and the trap arms 74 and 76. For example, this yielding of the molding foot 58 and/or trap arms 74 and 76 may occur in response to a force of 150 Newtons.

Thus, the biasing arms 78 and 80 will function to provide a first range (23 Newtons to 70 Newtons) of retention force on the molding 40, during the progressive movement of the molding 40 in the removal direction, until foot 58 will move through the distance "D" and become engaged with the trap ends 98 and 102 of the trap arms 74 and 76. Then, the trap arms 74 and 76 and biasing arms 78 and 80 provide a second range of retention force (70 Newtons to 150 Newtons) as the foot 58 yields and squeezes between the trap ends 98 and 102.

It will be understood that the retention forces discussed above are merely examples, and a person of skill in the art will be able to adjust the force levels as desired by selecting and changing the design of the molding 40 and/or the clip 42. For example, the dimension, shape, and durometer of the plastic molding 40 can be adjusted. And the shape and dimensions and the material of the clip 42 can be varied to adjust the retentive effort provided by the clip 42.

What is claimed is:
1. A ditch molding and molding clip for filling a ditch in a motor vehicle roof, comprising:

a molding having a head with left and right wings that lap onto the roof on opposite sides of the ditch, a stem depending from the head, and an enlarged foot at the lower end of the stem;

and a molding clip having a base mounted in the ditch, and left and right trap arms and left and right biasing arms extending upwardly from the base to engage with the foot of the molding;

said left and right biasing arms have thereon wedge faces that engage with the foot to urge the foot downwardly into the ditch and establish an installed position of the molding, and said left and right biasing arms yielding away from each other upon an upward movement of the foot to permit the upward movement;

and said left and right trap arms having trap ends overlying the foot in spaced relation therefrom when the molding is in the installed position until the upward movement of the foot causes the foot to engage with the trap ends of the trap arms so that the trap arms then trap the foot against further upward movement.

2. The ditch molding and molding clip of claim 1 further comprising said foot having a lower face including upwardly inclined left and right lower incline surfaces and an upper face including a left upper surface and a right upper surface, and said wedge faces of the left and right biasing arms engaging with the left upper surface and right upper surface of the foot.

3. The ditch molding and molding clip of claim 2 further comprising said wedge faces on the biasing arms including upper and lower wedge faces, said upper wedge faces being engaged by the lower incline surfaces of the molding when the molding is inserted into the ditch to thereby resiliently spread apart the left and right biasing arms and allow the further insertion of the molding to the installed position.

4. The ditch molding and molding clip of claim 1 further comprising said trap arms each having a ramp surface extending downwardly toward the ditch center and terminating at the trap ends, said ramp surfaces being engaged by the lower incline surfaces of the molding when the molding in inserted into the ditch to thereby resiliently spread apart the left and right trap arms and allow the further insertion of the molding to the installed position.

5. The ditch molding and molding clip of claim 1 further comprising upon the upward movement of the foot into engagement with the trap ends, the application of additional force in the upward direction causing the foot to resiliently yield and pass between the trap ends thereby permitting removal of the molding from the ditch.

6. The ditch molding and molding clip of claim 1 further comprising said molding being extruded of resilient material and during said molding being retained in the installed position in the ditch, said molding is flexed and the left and right wings are held in engagement with the roof by the downward biasing action of the left and right biasing arms acting on the foot.

7. The ditch molding and molding clip of claim 1 further comprising a plurality of said molding clips being mounted on the roof at spaced intervals along the ditch.

8. The ditch molding and molding clip of claim 1 further comprising said wedge faces being formed on the biasing arms and including upper and lower wedge faces, said upper wedge faces being engaged by the lower incline surfaces of the molding when the molding is inserted into the ditch to thereby resiliently spread apart the left and right trap arms and allow the further insertion of the molding to the installed position, and said trap arms each having a ramp surface extending downwardly toward the ditch center and terminating at the trap ends, said ramp surface being engaged by the lower incline surface of the molding when the molding is inserted into the ditch to thereby resiliently spread apart the left and right trap arms and allow the further insertion of the molding to the installed position.

9. The ditch molding and molding clip of claim 8 further comprising upon the upward movement of the foot into engagement with the trap ends, the application of additional force in the upward direction causing the foot to resiliently yield and pass between the trap ends and permit removal of the molding from the ditch.

10. The ditch molding and molding clip of claim 9 further comprising said molding being extruded of resilient material and during said molding being retained in the installed position in the ditch, said molding is flexed and the left and right wings are held in engagement with the roof by the downward biasing action of the left and right biasing arms acting on the foot.

11. A ditch molding and molding clip for filling a ditch in a motor vehicle roof, comprising:

a molding having a head with left and right wings that lap onto the roof on opposite sides of the ditch, a stem depending from the head, and an enlarged foot at the lower end of the stem having an upper face including a left upper surface and right upper surface;

a molding clip having a base mounted in the ditch, and left and right trap arms and left and right biasing arms extending upwardly from the base to engage with the enlarged foot of the molding;

said left and right biasing arms have thereon wedge faces that engage with the left and right upper surfaces of the enlarged foot to urge the foot downwardly into the ditch and said left and right biasing arms yielding away from each other upon an upward movement of the foot;

and said left and right trap arms having trap ends overlying the left and right upper surfaces in spaced relation therefrom when the molding is in the installed position until said upward movement permitted by the biasing arms causes the foot to engage with the ends of the trap arms so the trap arms then trap the foot against further upward movement.

12. The ditch molding and molding clip of claim 11 further comprising said molding having a lower face including upwardly inclined left and right lower incline surfaces, said trap arms each having a ramp surface extending downwardly toward the ditch center and terminating at the trap end, said ramp surface being engaged by the lower incline surface of the molding when the molding is inserted into the ditch to thereby resiliently spread apart the left and right trap arms and allow the further insertion of the molding, and said trap arms resiliently returning from the spread apart condition so that the trap arm ends then overlie the upper faces of the foot to retain the molding by blocking the molding from upward removal from the ditch.

13. The ditch molding and molding clip of claim 12 further comprising said wedge faces of the biasing arms including upper and lower wedge faces, said upper wedge faces being engaged by the lower incline surfaces of the molding when the molding is inserted into the ditch to thereby resiliently spread apart the left and right biasing arms and allow the further insertion of the molding, and said biasing arms resiliently returning from the spread apart condition so that the upper wedge faces of the biasing arms then obtain engagement with the upper faces of the molding foot and resiliently impose a force thereon constantly urging the molding in the direction of insertion;

and upon attempted removal of the molding from the ditch the biasing arms provide a first level of retention force against removal during a range of removal movement, and upon removal movement beyond the first range of removal movement the upper faces of the molding foot come into engagement with the trap ends of the trap arms to retain the molding by blocking the molding from further upward removal from the ditch.

14. The ditch molding and molding clip of claim 13 further comprising upon the upward movement of the foot into engagement with the trap ends, the application of additional force in the upward direction causing the foot to resiliently yield and pass between the trap ends and permit removal of the molding from the ditch.

15. The ditch molding and molding clip of claim 11 further comprising, said biasing arms each having a wedge formed thereon including upper and lower wedge faces, said upper wedge faces being engaged by the lower incline surfaces of the molding when the molding is inserted into the ditch to thereby resiliently spread apart the left and right biasing arms and allow the further insertion of the molding, and said biasing arms resiliently returning from the spread apart condition so that the upper wedge faces of the biasing arms then obtain engagement with the upper faces of the molding and resiliently impose a force thereon constantly urging the molding in the direction of insertion;

and upon attempted removal of the molding from the ditch the biasing arms provide a first level of retention force against removal during a range of removal movement, and upon removal movement beyond the first range of removal movement the upper faces of the molding foot come into engagement with the trap ends of the trap arms to retain the molding by blocking the molding from further upward removal from the ditch.

16. The ditch molding and molding clip of claim 15 further comprising said trap arms each having a ramp surface extending downwardly toward the ditch center and terminating at the trap end, said ramp surface being engaged by the lower incline surfaces of the molding when the molding is inserted into the ditch to thereby resiliently spread apart the left and right trap arms and allow the further insertion of the molding, and said trap arms resiliently returning from the spread condition so that the trap arm ends then overlie the foot in spaced relation from therefrom to retain the molding by blocking the molding from upward removal from the ditch.

17. The ditch molding and molding clip of claim 16 further comprising upon the upward movement of the foot into engagement with the trap ends, the application of additional force in the upward direction causing the foot to resiliently yield and pass between the trap ends and permit removal of the molding from the ditch.

18. A ditch molding and molding clip for filling a ditch in a motor vehicle roof, comprising:

a molding having a head for filling the width of the ditch, said head having left and right wings that lap onto the roof on opposite sides of the ditch, a stem depending from the head, and an enlarged foot at the lower end of the stem, said enlarged foot having a lower face including upwardly inclined left and right lower incline surfaces and an upper face including a left upper surface and right upper surface;

a molding clip having a base mounted in the ditch, and having left and right trap arms and left and right biasing arms extending upwardly from the base to engage with the enlarged foot of the molding;

said trap arms each having a ramp surface extending downwardly toward the ditch center and terminating at a trap end, said ramp surfaces being engaged by the lower incline surface of the molding when the molding in inserted into the ditch to thereby resiliently spread the left and right trap arms and allow the further insertion of the molding, and said trap arms resiliently returning from the spread condition so that the trap arm end then overlie the upper incline surfaces to retain the molding by blocking the molding from upward removal from the ditch;

said biasing arms each having a wedge formed on the end thereof and including upper and lower wedge faces, said upper wedge face being engaged by the lower incline surface of the molding when the molding is inserted into the ditch to thereby resiliently separate the legs and right trap arms and allow the further insertion of the molding, and said biasing arms resiliently returning from the spread condition so that the upper wedge faces of the biasing arms then obtain engagement with the upper faces of the molding and resiliently impose a force thereon constantly urging the molding in the direction of insertion;

and upon attempted removal of the molding from the ditch the biasing arms provide a first level of retention force against removal during a range of removal movement, and upon removal movement beyond the first range of removal movement the upper incline surfaces of the molding come into engagement with the trap arms to retain the molding by blocking the molding from further upward removal from the ditch.

19. The ditch molding and molding clip of claim 18 further comprising upon the upward movement of the foot into engagement with the trap ends, the application of additional force in the upward direction causing the foot to resiliently yield and pass between the trap ends and permit removal of the molding from the ditch.

* * * * *